Patented Mar. 18, 1952

2,589,687

UNITED STATES PATENT OFFICE 2,589,687

METHOD OF PREPARING LINEAR POLYESTERS

Paul J. Flory, Kent, and Frederick S. Leutner, Cuyahoga Falls, Ohio, assignors to Wingfoot Corporation, Akron, Ohio, a corporation of Delaware No Drawing. Application July 16, 1946, Serial No. 683,989

15 Claims. (Cl. 260—75)

This invention relates to a new and superior method for preparing linear polyesters and to linear polyesters prepared thereby having exceptionally high molecular weights.

Linear polyesters prepared by the condensation of glycols and dibasic acids are well known to the art and have been extensively investigated by W. H. Carothers and his co-workers. These compositions and methods for preparing them are described in United States Patents 2,071,250 and 2,071,251 to Carothers. These patents disclose methods for synthesizing various superpolymers, including the superpolyesters, prepared by reversible reactions wherein moderately volatile by-products, such as water, are evolved; for example, polymeric ethylene succinate may be prepared by the prolonged heating together of ethylene glycol and succinic acid. It is well known that the formation of high molecular weight condensation products requires that the reaction be carried very nearly to completion. In the preparation of polyesters by reversible methods, it is necessary that efficient methods for removal of the water, or other by-product, be used, in order that the condensation is not impeded by occurrence of the reverse reaction. Consequently the prior art is concerned with special methods for removing the by-products, for example, the use of a molecular still or other operations involving the use of low pressures with inert gas bubbling through the molten polymer. Furthermore, when these comparatively slow reversible reactions are employed, undesirably long reaction periods are required to achieve satisfactory molecular weight.

One purpose of this invention is to provide a method for the preparation of certain polyesters by a non-reversible condensation reaction. Another purpose of this invention is to prepare high molecular weight polyesters in a much shorter period of time than is required by prior art methods. A further purpose of this invention is to prepare linear polyesters of unusually high molecular weight.

These objects are accomplished by co-reacting one of a specific class of glycols in a high state of purity with a pure diacid chloride of a suitable dibasic acid. The reaction between the glycol and the dibasic acid chloride may be indicated as follows:

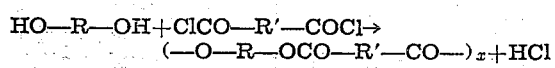

This condensation reaction differs from those disclosed in the prior art by being non-reversible; that is, the glycol and the dibasic acid chloride cannot be regenerated by the action of hydrogen chloride on the polyesters. Furthermore, the condensation is not impeded by the presence of the by-product, which in this case is hydrogen chloride. However, it is usually desirable to permit rapid evolution of the hydrogen chloride during the reaction. No special methods, such as the maintenance of high vacuum or blowing with inert gas for prolonged periods are required for the removal of this by-product, owing to its ready volatility.

One of the principal beneficial results achieved by the practice of this invention is the exceedingly rapid rate of reaction. Whereas it is customary to heat a dibasic acid with a glycol for a period of several days at a high temperature in order to reach a molecular weight which is adequate for the attainment of optimum physical properties, this method merely requires heating at moderate temperatures and for a few hours at most, and often the polymerization is substantially complete after heating for less than one hour. Because of the low temperature required and the short period of heating, the products are obtained in a colorless or a very light colored condition, being substantially unaffected by oxidation and other undesirable side reactions. Because of the rapidity and the non-reversible nature of this reaction, linear polyesters of exceptionally high molecular weights can be prepared.

The method of this invention is not applicable to the preparation of superpolymers from all glycols, and polymers of the desired high molecular weight are not obtained by the condensation of some glycols, for example, ethylene glycol with dibasic acid chlorides. In particular, it has been found that any aliphatic or cycloaliphatic glycol in which the shortest chain between the hydroxy groups has more than three atoms is useful. The operative glycols may be represented by the structural formula:

in which R may be any aliphatic divalent hydrocarbon, oxahydrocarbon, or thiahydrocarbon radical having at least four atoms, which may include an oxygen or sulfur atom, as well as carbon atoms, in the aliphatic chain between the two valence bonds. Thus, suitable glycols which may be used in the practice of this invention are tetramethylene glycol, hexamethylene glycol, decamethylene glycol, diethylene glycol, triethylene glycol, 1,4-quinitol, tetraethylene glycol, 2,2'-dihydroxy diethyl sulfide and 3,3'-dihydroxy dipropyl sulfide. Various homologues of the above dihydroxy hydrocarbons, dihydroxy oxahydrocarbons and dihydroxy thiahydrocarbons may also be used, provided there are at least four atoms in the shortest molecular chain between the two hydroxyl groups.

This invention may not be practicable with all dibasic acid chlorides; for example, the acid chloride of malonic acid is not operative. Acid chlorides which are suitable in the preparation of the polyesters are those which have at least three atoms in the shortest atom chain between the carbonyl groups and which have the carbonyl groups attached to aliphatic carbon atoms. Thus, useful acid chlorides include those of the aliphatic hydrocarbon dicarboxylic acids, such a glutaryl chloride, adipyl chloride, sebacyl chloride, subaryl chloride and the acid chlorides of pimelic acid, azelaic acid, brassylic acid and homologues thereof, the araliphatic hydrocarbon dicarboxylic acid chlorides, such as the phenylene diacetic acid chlorides, phenylene dipropionic acid chlorides, naphthalene diacetic acid chlorides, naphthalene dipropionic acid chlorides and homologues thereof containing longer aliphatic chains and other arylene radicals, the oxahydrocarbon dicarboxylic acid chlorides, such as the acid chloride of dihydracylic acid, the acid chloride of diglycolic acid and homologues containing other aliphatic or araliphatic radicals containing ether oxygen substituents, and the thiahydrocarbon aliphatic dicarboxylic acid chlorides containing aliphatic or araliphatic radicals which have a thio ether sulfur atom substituted therein, for example, thiodiglycolyl chloride,

ClCOCH$_2$SCH$_2$COCl

According to the practice of the present invention, polyesters are prepared by mixing molecular equivalent quantities of the glycol and the dibasic acid chloride. In some cases it is preferred to add the glycol to the dibasic acid chloride in successive portions, or in small increments, at a rate, such that there is no appreciable accumulation of unreacted glycol. Usually it is sufficient, however, merely to mix the total reactants in a single step. Portionwise addition of dibasic acid chloride to the glycol usually is undesirable; the hydrogen chloride released by the main reaction may react with the glycol, or induce it to etherify or to undergo other side reactions. If one or the other of the reactants is a solid at room temperature, it may be necessary to warm the mixture in order to effect complete solution; otherwise the reaction ordinarily begins at room temperature or slightly above with evolution of hydrogen chloride and a spontaneous rise in temperature. As the process proceeds, the mixture is warmed gradually to a temperature in the vicinity of 200° C. After maintaining the reaction mixture at this temperature for a few minutes, evolution of hydrogen chloride subsides and the polymerization is substantially complete. In some cases an additional, but relatively small, increase in molecular weight can be secured by heating for an additional 30 to 150 minutes. Hydrogen chloride is swept from the molten polymers by passing a stream of inert gas, such as oxygen-free nitrogen through the melt. Intermittent application of reduced pressure usually aids in the removal of bubbles from the viscous mass. The presence of traces of oxygen in contact with the polymer at high temperature leads to undesirable degradative reactions and other side reactions which cause discoloration of the polymer.

Ordinarily, it is desirable to employ reactants which are in a high state of purity; they should be at least 98 percent pure and preferably 99.5 percent or better. Otherwise, very high molecular weight products cannot be secured. Similarly, it is desirable to employ the reactants in very nearly molecularly equivalent proportions; preferably less than one percent excess of either reactant is used. Exceptions occur when one or the other reactant is lost by volatilization during the polymerization. In this case an excess of this reactant must be employed to compensate for the amount lost during polymerization.

It is true that certain impurities present in small amounts do not interfere with the progress of the polymerization; for example, certain bifunctional impurities which co-react with the main reactants may not exert a deleterious influence when present in small quantity. Certain other impurities, for example inert materials, can be compensated for by employing an appropriate excess of the slightly impure co-reactant. The generalizations in the preceding paragraph concerning the desirability of employing pure reactants have been drawn without consideration for these exceptions. Usually the precise nature of the impurities present in small amount is not definitely known. Consequently, it is sound practice to specify high purity in the starting materials.

The extent of polymerization, or number average molecular weight, can be estimated from a measurement of the viscosity of the molten polymer. A convenient method for measuring melt viscosity is described in the Journal of the American Chemical Society, 62, 1057 (1940). The average molecular weight M is related to the melt viscosity according to the empirical equation log $\eta = A + BM^{1/2}$ where $\eta$ is the viscosity in poises, and A and B are constants. These constants can be established by measuring the melt viscosities of polymers of known molecular weights. Polymers of known molecular weights can be prepared according to the process of the present invention by co-reacting the dibasic acid chloride with a predetermined excess of the glycol. The molecular weights can then be estimated by calculations based on the amount of glycol employed in excess of equivalency; equations given in the literature on condensation polymers can be employed for this purpose (see J. Am. Chem. Soc., 56, 1877 (1936); J. Am. Chem. Soc., 62, 1057, 2255 (1940)). The constants, A and B, in the above equation vary somewhat from one polyester to another, depending on the particular pair of co-reactants employed. However, this variation generally is small, and consequently it is not always necessary to evaluate the constants for each polyester. Rough estimates of molecular weight can be made from the melt viscosity by employing the contacts known to apply to an analogous polymer.

The superpolymers prepared in accordance with this invention will generally have a melt viscosity of over 25 poises at 200° C., or above if the melting point of the superpolymer exceeds 200° C. The preferred polymers will have melt viscosities in excess of 50 poises. Some of the products will have lower melt viscosities.

Polyesters having molecular weights above about 10,000 are prepared with difficulty by prior art methods employing reversible condensation reactions. Only in a few cases have polymers with molecular weights above 15,000 been prepared by these methods. The non-reversible acid chloride method on the other hand generally produces polymers having molecular weights above 15,000. Often the molecular weights exceed 25,000.

The method of this invention may also be used to prepare condensation products from a plurality of the glycols and one of the acid chlorides of the dibasic acids, from one of the glycols and a plurality of the acid chlorides of dibasic acids, or from a mixture of two or more glycols and two or more of the acid chlorides. These interpolymeric condensation products are usually more thermoplastic and less crystalline than those prepared from a single glycol and a single acid chloride. The interpolymeric types are usually less desirable for the preparation of filaments and fibers. As described above, the interpolymeric types are usually and preferably prepared from pure reagents used in equimolar proportions.

The polymers are frequently crystalline solids at room temperatures and have melting points which depend upon the particular combination of reactants employed. Some of the polymers, for example, those made from the polyethylene glycols, are usually viscous liquids at room temperatures and others are decidedly rubber-like. Generally, the polymers can be converted to a liquid or non-crystalline state by heating.

The polyesters prepared in accordance with this invention are useful compositions for the preparation of fibers, sheets, and other molded shapes. The compositions may be extruded in either the molten state, or in solution in suitable solvents through orifices or dies and subsequently solidified by cooling, or in the case of solutions, by contacting with a drying atmosphere or other means for removing the solvent. The fibers which are prepared from the high molecular weight compositions are capable of being cold drawn, which operation produces a reduction in the extensibility and increases the tensile strength of the filament. The tensilized filaments are useful in the preparation of woven fabrics or as bristles in the manufacture of brushes. Smooth sheets or films of the polymers may be prepared by casting the polymer solutions on smooth surfaces, or by calendering the polymer between rollers, heating if necessary to soften the polymer. The interpolymeric condensation products are not useful in the preparation of filaments, but can be used as coating compositions, films and as rubber substitutes. Generally, any of the crystalline or non-crystalline types may be fabricated to form articles of irregular shape by molding under the influence of heat and pressure.

Further details of the preparation of polyesters in accordance with this invention are set forth in the following examples.

*Example 1*

A closed glass reaction vessel was provided with a pipette type of viscometer and was vented through a two-way valve to the atmosphere or to a vacuum pump. The viscometer was adjustable so that the end thereof could be immersed in the polymer within the reaction vessel. The viscometer was also used to provide a slow stream of oxygen-free nitrogen through the reaction flask during the course of the reaction. Equivalent weights of the reactants, 3.605 parts by weight of decamethylene glycol and 4.949 parts of sebacyl chloride, were placed in the vessel and heated for 5 minutes at 110° C. The temperature was then increased to 218° C. and within a few minutes a very viscous polymer was obtained. After two hours a vacuum of 10 mm. total pressure was applied for about 5 minutes to remove gas bubbles consisting of hydrogen chloride gas. At the end of two hours the polymer was found to have a viscosity of 6900 poises and at the end of four hours a viscosity of 14,500 poises. The elapsed time of reaction required to produce these viscous polymers is probably longer than would be required since it was necessary to allow the highly viscous polymer to flow to a compact mass at the bottom of the vessel before viscosity measurements could be made properly.

For comparison with the above reaction, 9.193 parts by weight of sebacic acid and 8.018 parts of decamethylene glycol (1.012 molecular equivalents) were placed in a similar reaction vessel. After heating one hour at 176° C. while bubbling nitrogen through the melt, the temperature was raised to 218° C. and heated at this temperature until a viscosity approximately equal to that obtained from the above-described preparation involving sebacyl chloride was reached. The viscosities were measured at convenient intervals and are set forth in the following table.

| Time—Hrs. at 218 °C. | Viscosity—Poises at 218 °C— | |
|---|---|---|
| | When prepared with sebacyl chloride | When prepared with sebacic acid |
| 2 | 6,900 | |
| 4 | 14,500 | |
| 9 | | 6 |
| 33 | | 384 |
| 39 | | 540 |
| 84 | | 2,550 |
| 103 | | 14,700 |

The above tabulated data demonstrate that the reaction involving the use of the acid chloride is very much faster than the corresponding reaction involving the corresponding acid. In addition, the polymer prepared from the acid chloride was a white crystalline solid, whereas the polyester prepared from the acid was quite dark in color and contained some gelatinous matter. The composition prepared in accordance with the prior art method was not entirely thermoplastic. The composition prepared from the acid chloride was capable of being extruded into filaments which could be cold drawn into strong resilient fibers.

To demonstrate the critical nature of the stipulation concerning the length of the glycol unit, 2.233 parts by weight of trimethylene glycol and 7.002 parts (one equivalent) of sebacyl chloride were reacted using a procedure identical to that given above. The reactants were heated for 45 minutes at 110° C. and for two hours at 218° C. A viscosity of 0.9 poise was obtained and the polymer, which was slightly colored at room temperature, could not be drawn into fibers.

*Example 2*

Using the apparatus and procedure described in Example 1, 5.603 parts by weight of decamethylene glycol and 5.89 parts (one equivalent) of freshly distilled adipyl chloride were co-reacted. The reactants were heated at 110° C. in a slow stream of pure nitrogen for about 10 minutes and then at 218° C. for 1½ hours. The resulting polymer had a viscosity of 6800 poises at 218° C. and solidified to a white crystalline material at room temperature which could be drawn into fibers capable of being cold drawn with an incident increase in tensile strength.

To demonstrate the critical nature of the stipulation relating to the acid chlorides which may be employed successfully, a control was run in which succinyl chloride was substituted for the adipyl chloride. In this preparation, which was conducted identically to that described above, 6.629 parts of decamethylene glycol and 6.003 parts (1.01 equivalent) of pure succinyl chloride were reacted in a slow stream of pure nitrogen while gradually increasing the temperature from 110° C. to 218° C. over a period of about 8½ hours. At this time a melt viscosity of 1.9 poises was measured. The product was a white solid at room temperature but could not be drawn into fibers.

*Example 3*

Using an apparatus identical to that used in Example 1, and a similar procedure, 7.061 parts of sebacyl chloride and 3.151 parts (1.006 equivalent) of diethylene glycol were placed in the reaction vessel at a temperature below 25° C. The reaction temperature was then increased to 110° C. and maintained thereat for one-half hour, after which the temperature was increased to 218° C. which was maintained for one hour and 15 minutes. At the end of this time the melt viscosity was 92 poises. The polyester so formed was a white translucent solid softening at a temperature of 35 to 38° C.

Although the invention has been defined with respect to specific examples, it is not intended that the details thereof shall be construed as limitations upon the scope of the invention except to the extent incorporated in the following claims.

We claim:

1. A method of preparing a superpolyester which consists of forming a mixture in which the sole reactants are equimolecular proportions of (A) a glycol in which the shortest atom chain between the two hydroxyl groups contains at least four atoms and which has the structural formula:

in which R is a divalent radical of the group consisting of cycloaliphatic hydrocarbon, aliphatic hydrocarbon, aliphatic oxahydrocarbon and aliphatic thiahydrocarbon radicals and (B) an acid chloride having the molecular structure

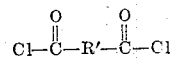

in which R' is any divalent radical of the group consisting of hydrocarbon, thiahydrocarbon, and oxahydrocarbon radicals, in which the shortest chain between the carbonyl groups contains at least three atoms, and in which the carbonyl groups are attached to aliphatic carbon atoms, and heating the mixture until the resultant polyester has attained a number average molecular weight of at least 10,000.

2. The method defined by claim 1 in which the heating and mixing are performed simultaneously.

3. A method of preparing superpolyesters which consists of forming a mixture in which the sole reactants are equimolecular proportions of an aliphatic glycol in which there is a hydrocarbon chain of at least four carbon atoms between the two hydroxyl groups, said glycol containing only carbon and hydrogen atoms, except for the hydroxyl oxygen, and an acid chloride having the structural formula:

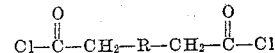

in which R is any divalent hydrocarbon radical, and heating said mixture until the resultant polyester has attained a number average molecular weight of at least 10,000.

4. The method defined by claim 3 in which the heating and mixing are performed simultaneously.

5. A method of preparing superpolyesters which consists of forming a mixture in which the sole reactants are equimolecular proportions of decamethylene glycol and sebacyl chloride, and heating said mixture until the resultant polyester has attained a number average molecular weight of at least 10,000.

6. The method defined by claim 5 in which the mixing and heating are performed simultaneously.

7. A method of preparing superpolyesters which consists of forming a mixture in which the sole reactants are equimolecular proportions of decamethylene glycol and adipyl chloride, and heating said mixture until the resultant polyester has attained a number average molecular weight of at least 10,000.

8. The method defined by claim 7 in which the mixing and heating are performed simultaneously.

9. A method of preparing superpolyesters which consists of forming a mixture in which the sole reactants are equimolecular proportions of diethylene glycol and sebacyl chloride, and heating said mixture until the resultant polyester has attained a number average molecular weight of at least 10,000.

10. The method defined by claim 9 in which the mixing and heating are performed simultaneously.

11. A method of preparing a superpolyester which consists of forming a mixture in which the sole reactants are equimolecular proportions of (A) at least one glycol in which the shortest atom chain between the two hydroxyl groups contains at least four atoms and which has the structural formula:

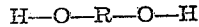

in which R is a divalent radical of the group consisting of cycloaliphatic hydrocarbon, aliphatic hydrocarbon, aliphatic oxahydrocarbon and aliphatic thiahydrocarbon radicals and (B) at least one acid chloride having the molecular structure

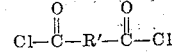

in which R' is any divalent radical of the group consisting of hydrocarbon, thiahydrocarbon, and oxahydrocarbon radicals, in which the shortest chain between the carbonyl groups contains at least three atoms, and in which the carbonyl groups are attached to aliphatic carbon atoms, and heating the mixture until the resultant polyester has attained a number average molecular weight of at least 10,000.

12. A method of preparing a superpolyester which consists of forming a mixture in which the sole reactants are equimolecular proportions of (A) at least one glycol in which the shortest atom chain between the two hydroxyl groups contains at least four atoms and which has the structural formula:

in which R is a divalent radical of the group consisting of cycloaliphatic hydrocarbon, aliphatic hydrocarbon, aliphatic oxahydrocarbon and aliphatic thiahydrocarbon radicals and (B) at least one acid chloride having the molecular structure

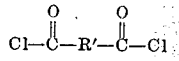

in which R' is any divalent radical of the group consisting of hydrocarbon, thiahydrocarbon, and oxahydrocarbon radicals, in which the shortest chain between the carbonyl groups contains at least three atoms, and in which the carbonyl groups are attached to aliphatic carbon atoms, and heating the mixture until the resultant polyester has attained a number average molecular weight of at least 15,000.

13. A method of preparing a superpolyester which consists of forming a mixture in which the sole reactants are equimolecular proportions of (A) at least one glycol in which the shortest atom chain between the two hydroxyl groups contains at least four atoms and which has the structural formula:

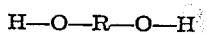

in which R is a divalent radical of the group consisting of cycloaliphatic hydrocarbon, aliphatic hydrocarbon, aliphatic oxahydrocarbon and aliphatic thiahydrocarbon radicals and (B) at least one acid chloride having the molecular structure

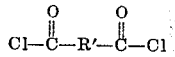

in which R' is any divalent radical of the group consisting of hydrocarbon, thiahydrocarbon, and oxahydrocarbon radicals, in which the shortest chain between the carbonyl groups contains at least three atoms, and in which the carbonyl groups are attached to aliphatic carbon atoms, and heating the mixture until the resultant polyester has attained a number average molecular weight of at least 25,000.

14. A method according to claim 3 in which the glycol is tetramethylene glycol.

15. A method according to claim 3 in which the glycol is hexamethylene glycol.

PAUL J. FLORY.
FREDERICK S. LEUTNER.

REFERENCES CITED

The following references are of record in the file of this patent:

UNITED STATES PATENTS

| Number | Name | Date |
|---|---|---|
| 2,012,267 | Carothers | Aug. 27, 1935 |
| 2,094,608 | Kritchevsky | Oct. 5, 1937 |
| 2,224,037 | Brubaker et al. | Dec. 3, 1940 |
| 2,314,972 | Dreyfus | Mar. 30, 1943 |
| 2,437,046 | Rothrock et al. | Mar. 2, 1948 |
| 2,465,150 | Dickson | Mar. 22, 1949 |
| 2,465,319 | Whinfield et al. | Mar. 22, 1949 |

FOREIGN PATENTS

| Number | Country | Date |
|---|---|---|
| 63,874 | Denmark | Aug. 27, 1945 |

OTHER REFERENCES

Wertheim, Textbook of Organic Chemistry (page 193), 2nd edition, 1945, published by Blakiston Co., Philadelphia, Pa.